(12) United States Patent  
Nakahashi

(10) Patent No.: US 7,609,404 B2
(45) Date of Patent: Oct. 27, 2009

(54) PRINTING CONTROL APPARATUS, PRINTING MANAGEMENT APPARATUS, PRINTING SYSTEM, PRINTING CONTROL METHOD, PRINTING MANAGEMENT METHOD, PRINTING CONTROL PROGRAM, AND PRINTING MANAGEMENT PROGRAM

(75) Inventor: Hidesumi Nakahashi, Tokyo (JP)

(73) Assignee: Seiko Epson Corporation (JP)

( * ) Notice: Subject to any disclaimer, the term of this patent is extended or adjusted under 35 U.S.C. 154(b) by 834 days.

(21) Appl. No.: 11/174,953

(22) Filed: Jul. 5, 2005

(65) Prior Publication Data

US 2006/0007482 A1    Jan. 12, 2006

(30) Foreign Application Priority Data

Jul. 6, 2004  (JP) .............................. 2004-199668

(51) Int. Cl.
*G06F 15/00* (2006.01)
*G06F 15/16* (2006.01)

(52) U.S. Cl. ...................................... 358/1.15; 709/203

(58) Field of Classification Search ................ 358/1.14, 358/1.15, 1.16, 1.13, 1.9, 1.05, 296; 709/203, 709/219, 220, 229, 224; 400/62, 63, 67, 400/582; 399/1, 87, 299; 705/30, 408
See application file for complete search history.

(56) References Cited

U.S. PATENT DOCUMENTS 5,287,194 A * 2/1994 Lobiondo .................... 358/296

2002/0042838 A1 * 4/2002 Tabayoyon et al. ......... 709/237

FOREIGN PATENT DOCUMENTS

| JP | 09-128171   | 5/1997  |
|----|-------------|---------|
| JP | 10-006619   | 1/1998  |
| JP | 11-327840   | 11/1999 |
| JP | 2002-032205 | 1/2002  |
| JP | 2003-063105 | 3/2003  |
| JP | 2003-211795 | 7/2003  |
| JP | 2003-323279 | 11/2003 |

OTHER PUBLICATIONS http:www.kernelsupport.co.jp/seihinntop.htm (Kernel Support, Product introduction, Jul. 5, 2004) with an English version thereof.

* cited by examiner

*Primary Examiner*—Saeid Ebrahimi Dehkordy
(74) *Attorney, Agent, or Firm*—Harness, Dickey & Pierce, P.L.C.

(57) ABSTRACT

A printing control apparatus in a printing system, the printing system including a terminal apparatus; a plurality of printer apparatuses connected to the terminal apparatus; and a printing management apparatus connected to the printing system, the printing control apparatus including: a reception unit that receives a print job sent by the terminal apparatus; a transmission unit that sends the print job received by the reception unit to the printing management apparatus; a print job requesting unit that sends the printing management apparatus a print job send request requesting at least one print job that has been sent by another printing control apparatus that is different from the printing control apparatus; and an output unit that receives a print job sent by the printing management apparatus in response to the print job send request from the print job requesting unit, and sends the received print job to the printer apparatus.

7 Claims, 6 Drawing Sheets

FIG. 4

USER A
- JOB A01
- JOB A02
- JOB A03

USER B
- JOB B01
- JOB B05
- JOB B14

⋮

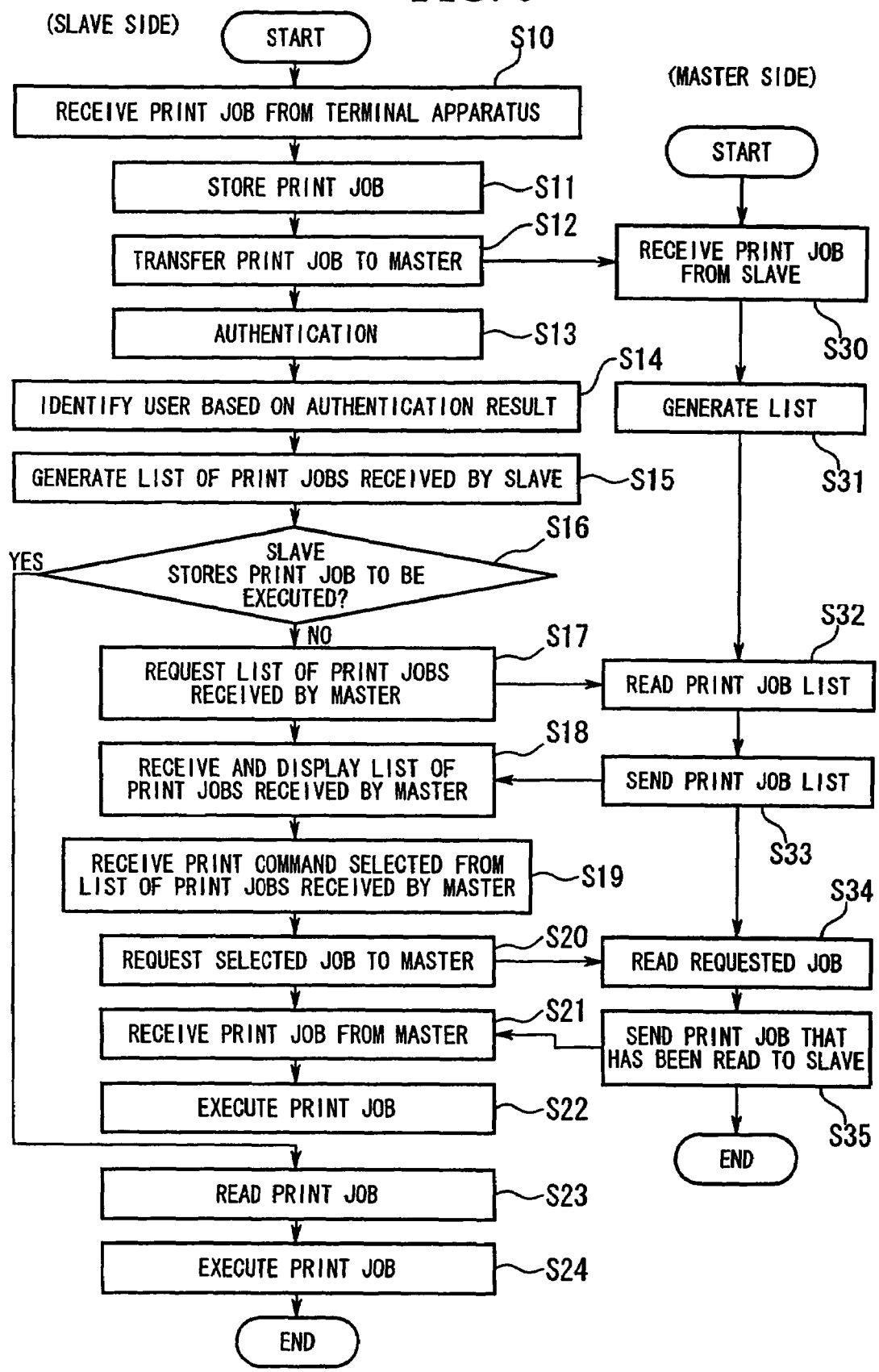

PRINTING CONTROL APPARATUS, PRINTING MANAGEMENT APPARATUS, PRINTING SYSTEM, PRINTING CONTROL METHOD, PRINTING MANAGEMENT METHOD, PRINTING CONTROL PROGRAM, AND PRINTING MANAGEMENT PROGRAM

BACKGROUND OF THE INVENTION

1. Field of the Invention

The present invention relates to a printing control apparatus, to a printing management apparatus, to a printing system, to a printing control method, to a printing management method, to a printing control program, and to a printing management program.

Priority is claimed on Japanese Patent Application No. 2004-199688, filed Jul. 6, 2004, the content of which is incorporated herein by reference.

2. Description of Related Art

Conventionally, a system has been utilized in which multiple printers and a computer are connected via a network, and a print job is executed by selecting one of the multiple printers for executing the print job. The system has a server set up on the network. In such a system, print jobs are sent from the computer to the server and are spooled. Each of the printers receives print jobs from the server, and executes the received print jobs. In this system, in a case where an error occurs in a printer designated for the print job or the designated printer is busy, the server sends the print job to a second printer and the second printer executes the print job. By this means, the time the user waits until the print job is completed can be shortened (for example, see Japanese Unexamined Patent Application, First Publication No. 2002-032205, and http://www.kernel-support.co.jp/seihinntop.htm).

However, in the above-described system, in a case where the server is down due to hardware malfunction or failure of power to the server, the server cannot send print jobs. In such a case, print jobs cannot be executed even through all of the printers are working properly. In addition, the system requires installation of the server, which incurs increased cost and additional man-hours needed for maintenance of the server.

SUMMARY OF THE INVENTION

The present invention was conceived in view of the above-mentioned situations, and an object thereof is to provide a printing control apparatus, a printing management apparatus, a printing control method, a printing management method, a printing control program, and a printing management program that allow execution of a print job even when the server in the system is down.

In order to solve the problems described above, a first aspect of the present invention is a printing control apparatus in a printing system, the printing system including a terminal apparatus; a plurality of printer apparatuses connected to the terminal apparatus; and a printing management apparatus connected to the printing system, the printing control apparatus including: a reception unit that receives a print job sent by the terminal apparatus; a transmission unit that sends the print job received by the reception unit to the printing management apparatus; a print job requesting unit that sends the printing management apparatus a print job send request requesting at least one print job that has been sent by another printing control apparatus that is different from the printing control apparatus; and an output unit that receives a print job sent by the printing management apparatus in response to the print job send request from the print job requesting unit, and sends the received print job to the printer apparatus.

According to a second aspect of the present invention, the above-described printing control apparatus may further include: a list requesting unit that sends to the printing management apparatus a print job list information send request requesting a list of at least one print job stored in the printing management apparatus; and a list information reception unit that receives a print job list information sent from the printing management apparatus in response to the list information send request from the list requesting unit.

A third aspect of the present invention is a printing management apparatus in a printing system, the printing system including a terminal apparatus; a plurality of printer apparatuses connected to the terminal apparatus; and a printing control apparatus provided for one of the printer apparatuses; the printing management apparatus connected to the printing system, the printing management apparatus including: a reception unit that receives a print job sent by the printing control apparatus; a print job storage unit that stores the print job received by the reception unit; and a print job transmission unit that reads the print job from the print job storage unit in response to a print job send request from the printing control apparatus, and sends the print job to the printing control apparatus.

According to a fourth aspect of the present invention, the above-described printing management apparatus may further include: a list information storage unit that stores the list of the at least one print job that is stored in the print job storage unit; a list information transmission unit that reads from the list information storage unit the list in response to a list information send request sent from the printing control apparatus, and sends the read list to the printing control apparatus.

A fifth aspect of the present invention is a printing system, including: a terminal apparatus; a plurality of printer apparatuses connected to the terminal apparatus; a printing control apparatus provided for one of the printer apparatuses; and a printing management apparatus connected to the printing system, wherein the printing control apparatus includes: a reception unit that receives a print job sent by the terminal apparatus; a transmission unit that sends the print job received by the reception unit to the printing management apparatus; a print job requesting unit that sends the printing management apparatus a print job send request requesting at least one print job that has been sent by another printing control apparatus that is different from the printing control apparatus; and an output unit that receives a print job sent by the printing management apparatus in response to the print job send request from the print job requesting unit, and sends the received print job to the printer apparatus, wherein the printing management apparatus includes: a reception unit that receives a print job sent by the printing control apparatus; a print job storage unit that stores the print job received by the reception unit; and a print job transmission unit that reads the print job from the print job storage unit in response to a print job send request from the printing control apparatus, and sends the print job to the printing control apparatus.

A sixth aspect of the present invention is a print control method used in a printing control apparatus in a printing system, the printing system including a terminal apparatus; a plurality of printer apparatuses connected to the terminal apparatus; and a printing management apparatus connected to the printing system, the print control method including: receiving a print job sent by the terminal apparatus; sending the received print job to the printing management apparatus; sending to the printing management apparatus a print job send request requesting at least one print job that has been sent by another printing control apparatus that is different from the printing control apparatus; and receiving a print job sent by the printing management apparatus, and sending the received print job to the printer apparatus.

A seventh aspect of the present invention is a print management method used in a printing management apparatus in a printing system, the printing system including a terminal apparatus; a plurality of printer apparatuses connected to the terminal apparatus; a printing control apparatus provided for one of the printer apparatuses; and the printing management apparatus connected to the printing system, the printing management method including: receiving and storing a print job sent by the printing management apparatus; and reading from the print job storage unit the print job in response to a send request from the printing control apparatus, and sending the print job to the printing control apparatus.

An eighth aspect of the present invention is a printing control program used in a printing control apparatus in a printing system, the printing system including a terminal apparatus; a plurality of printer apparatuses connected to the terminal apparatus; and a printing management apparatus connected to the printing system, the printing control program including the steps of: receiving a print job sent by the terminal apparatus; sending the received print job to the printing management apparatus; sending to the printing management apparatus a print job send request requesting at least one print job that has been sent by another printing control apparatus that is different from the printing control apparatus; and receiving a print job sent by the printing management apparatus, and sending the received print job to the printer apparatus.

A ninth aspect of the present invention is a printing management program used in a printing management apparatus in a printing system, the printing system including a terminal apparatus; a plurality of printer apparatuses connected to the terminal apparatus; a printing control apparatus provided for one of the printer apparatuses; and the printing management apparatus connected to the printing system, the printing management program including: receiving and storing a print job sent by the printing management apparatus; and reading from the print job storage unit the print job in response to a send request from the printing control apparatus, and sending the print job to the printing control apparatus.

In the present invention, a print job sent from the terminal apparatus is received and is sent to the printing management apparatus. Other print jobs than the ones sent by the printing control apparatus is received from the printing management apparatus and the print jobs are output to the printer apparatus. Thus, it is possible to receive and execute a print job on a printer apparatus that has not been selected for printing.

BRIEF DESCRIPTION OF THE DRAWINGS

FIG. 4 shows one example of a list according to the present invention;

FIG. 6 is a flowchart showing the operation of the printing system shown in FIG. 1.

DETAILED DESCRIPTION OF THE INVENTION

A printing system according to one embodiment of the present invention will now be described with reference to the attached drawings.

Figure 1:
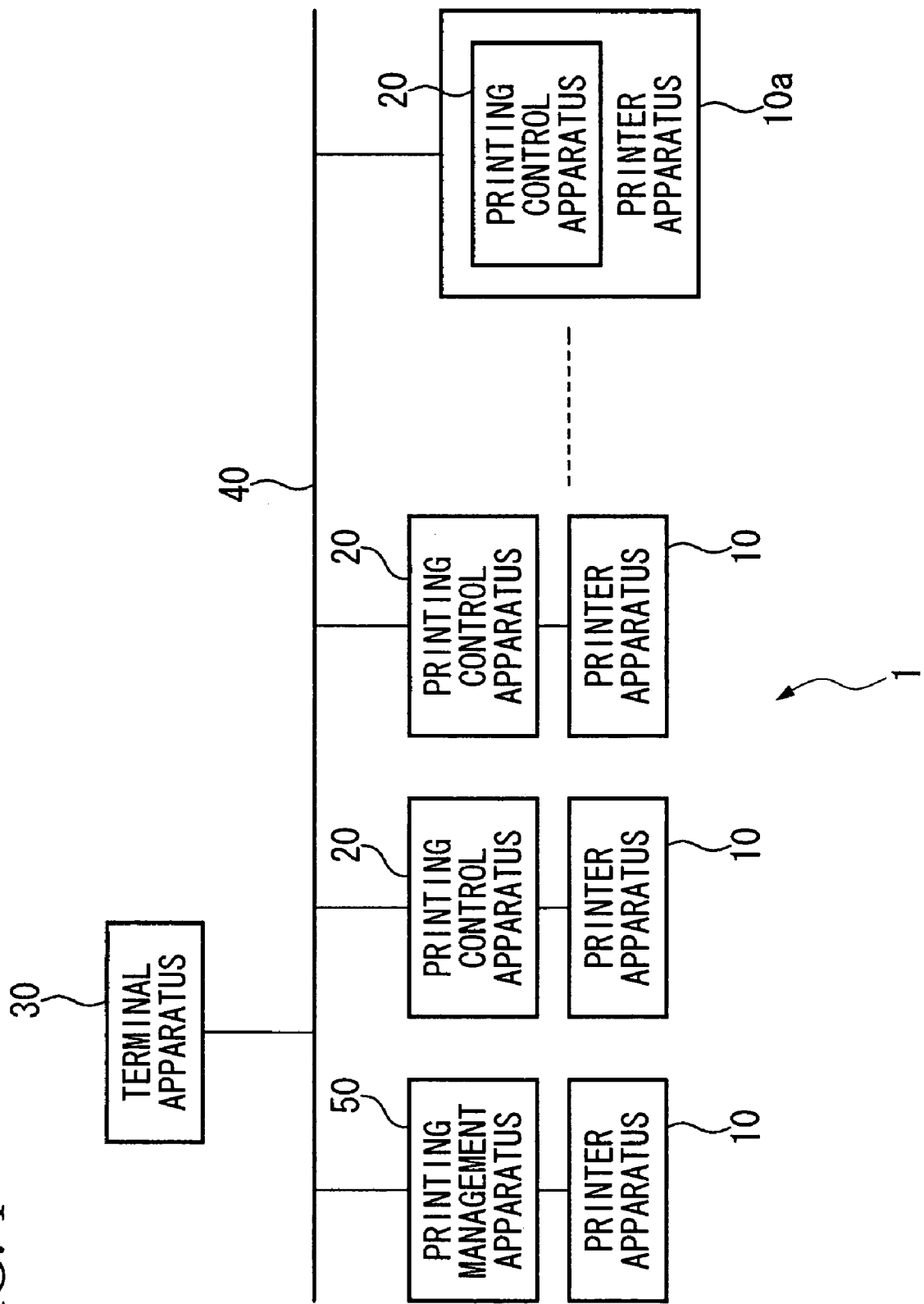
FIG. 1 is a schematic block diagram illustrating a printing system according to an embodiment of the present invention.

FIG. 1 is a schematic block diagram illustrating a printing system according to an embodiment of the present invention. In FIG. 1, printing control apparatuses 20 are provided for printer apparatuses 10, and multiple printer apparatuses 10 are connected to a terminal apparatus 30 via a network 40, and a printing management apparatus 50 is also connected thereto. Each of the printer apparatuses 10 are connected to either one of the printing control apparatuses 20 or the printing management apparatus 50. The printer apparatuses 10 execute printing on a printing medium, such as paper, according to print jobs sent by the printing control apparatuses 20 or the printing management apparatus 50. The printing control apparatuses 20 serve as slaves with respect to the printing management apparatus 50, whereas the printing management apparatus 50 serves as a master with respect to each of the printing control apparatuses 20, thereby sending print jobs to and receiving print jobs from the printing control apparatuses 20, which will be described later. The terminal apparatus 30 may be a computer, such as a personal computer, and the terminal apparatus 30 generates print data to be printed onto the printing medium and sends it as a print job. As the network 40, any suitable network, for example, a local area network (LAN) or the Internet, may be used, and the network 40 may be configured as a wired network, a wireless network, or a hybrid network thereof.

Figure 2:
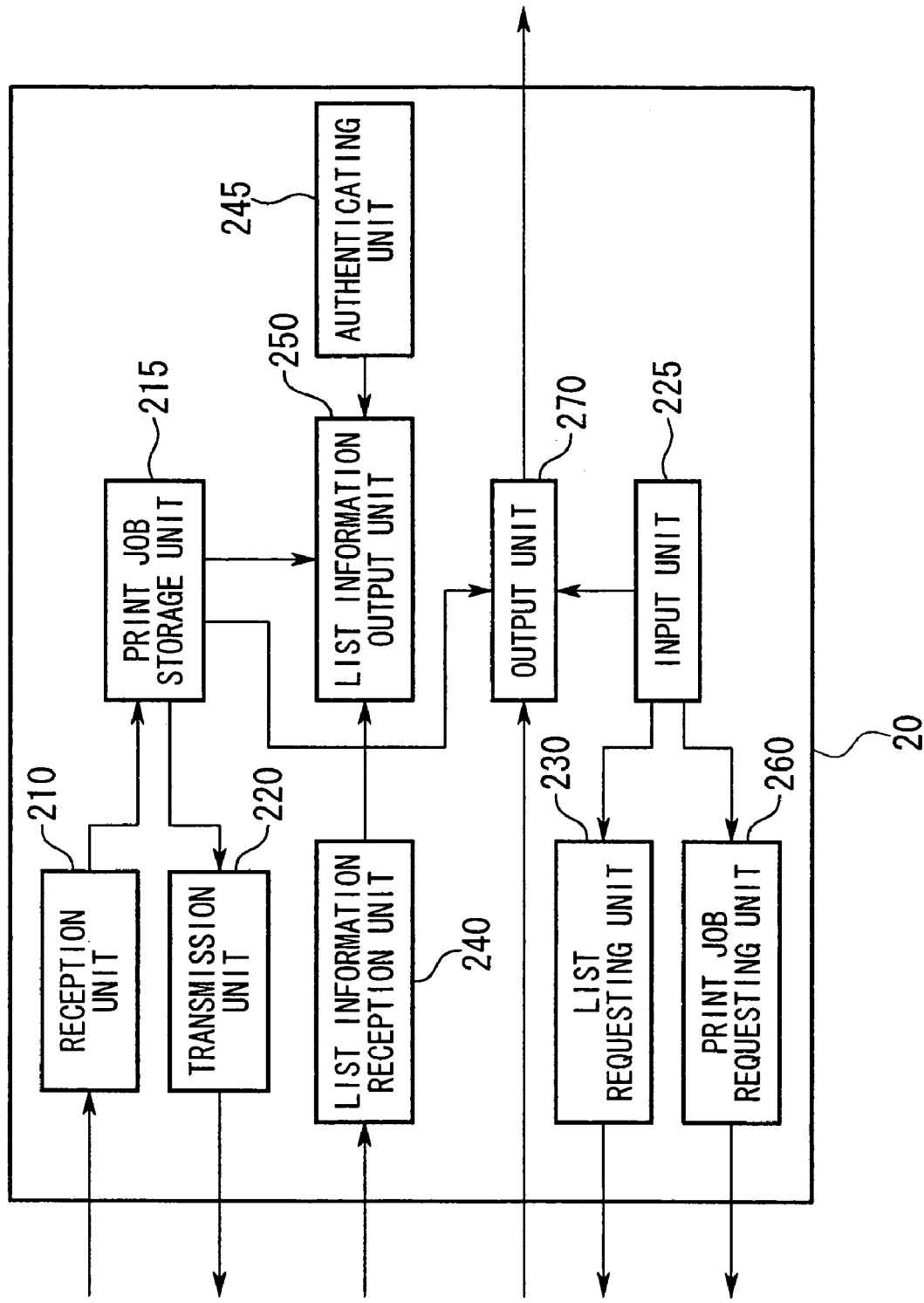
FIG. 2 is a schematic block diagram illustrating the configuration of a printing control apparatus according to the present invention.

Next, the printing control apparatuses 20 will be described with reference to FIG. 2. FIG. 2 is a schematic block diagram illustrating the configuration of a printing control apparatus 20 according to an embodiment of the present invention. Each of the printing control apparatuses 20 includes a reception unit 210, a print job storage unit 215, a transmission unit 220, an input unit 225, a list requesting unit 230, a list information reception unit 240, an authenticating unit 245, a list information output unit 250, a print job requesting unit 260, and an output unit 270. In FIG. 2, the reception unit 210 receives a print job sent from the terminal apparatus 30. The print job storage unit 215 stores the print job that has been received by the reception unit 210. The transmission unit 220 sends the print job that has been received by the reception unit 210 and has been stored in the print job storage unit 215 to the printing management apparatus 50.

The input unit 225 receives an instruction from the user and sends it to the list requesting unit 230, the print job requesting unit 260, and/or the output unit 270 depending on the instruction. The list requesting unit 230 sends a list information send request requesting list information of the print jobs stored in the printing management apparatus 50 to the printing management apparatus 50 in response to the instruction that has been entered into the input unit 225 by the user. The list information reception unit 240 receives the list information sent from the printing management apparatus 50 in response to the request from the list requesting unit 230.

The authenticating unit 245 executes an authentication on the user who is attempting to access a printer apparatus 10 connected to a printing control apparatus 20. For example, data used for the authentication may be stored beforehand in memory of the authenticating unit 245, and during the authentication, user information entered by the user is compared against the authentication data of the user to decide whether or not the entered data and the stored data match. In this example, for entry of the user information, the user may enter his or her user ID via an input device such as a touch panel, or a fingerprint of the user may be scanned, or information encoded in an RFID (Radio Frequency Identification) tag may be read by an RFID reader, or information stored in an IC card may be read.

The list information output unit 250 displays list information of all print jobs sent by the user from the terminal apparatus 30 who has been authenticated by the authenticating unit 245. As the list information output unit 250, for example, a display apparatus, such as a touch panel, may be used, and the list information output unit 250 may be also able to receive instructions from the user. The print job requesting unit 260 sends a print job send request requesting all of print jobs other than the ones sent by this print job requesting unit 260 to the printing management apparatus 50 in response to the instruction that has been entered into the input unit 225 by the user. The output unit 270 receives print jobs sent by the printing management apparatus 50 in response to the print job request from the print job requesting unit 260, and sends the received print jobs to the printer apparatus 10. In addition, the output unit 270 reads a print job stored in the print job storage unit 215 according to the instruction that has been input via the input unit 225, and outputs it to the printer apparatus 10.

Figure 3:
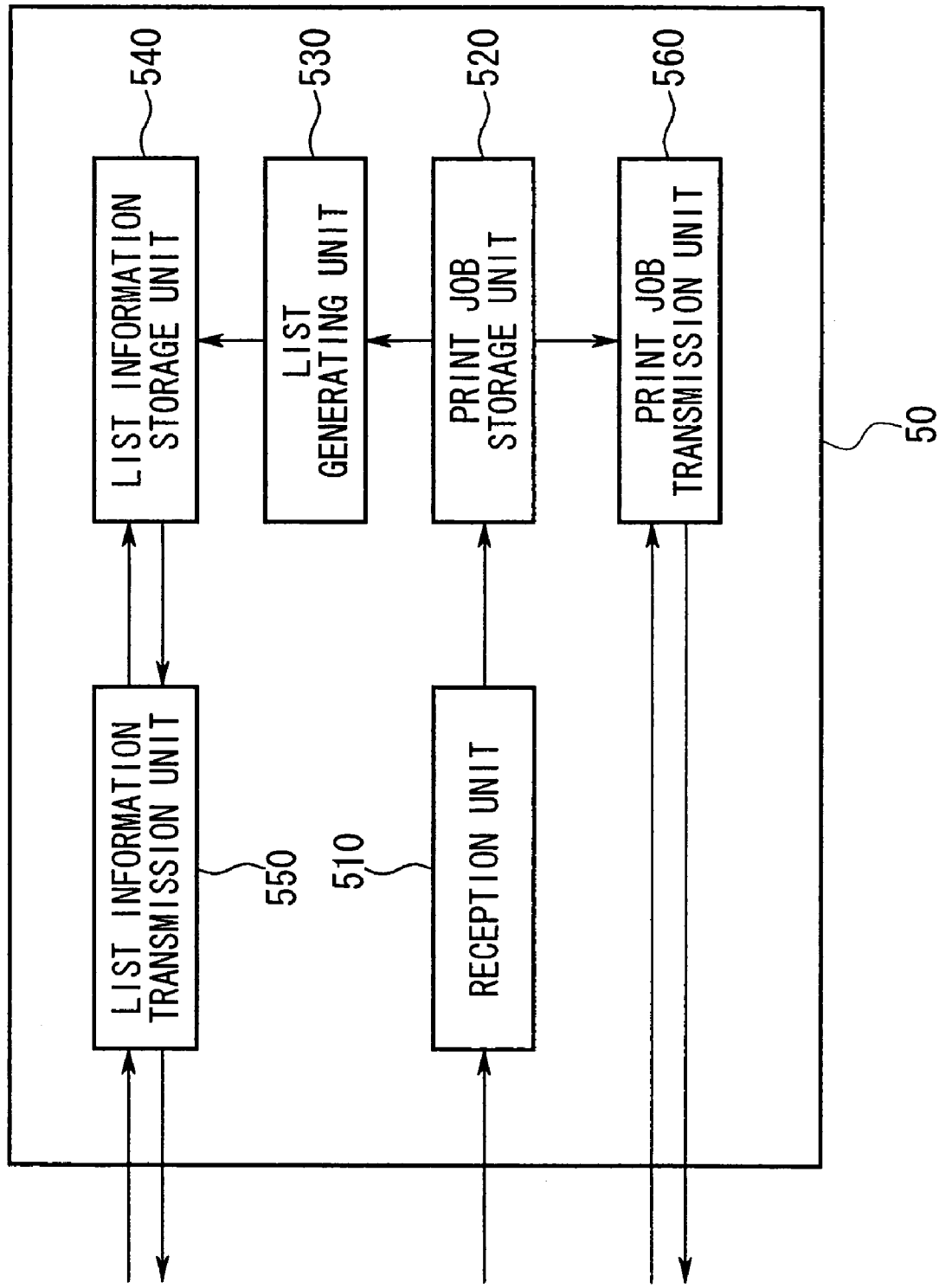
FIG. 3 is a schematic block diagram illustrating the configuration of a printing management apparatus according to the present invention.

Next, the printing management apparatuses 50 will be described with reference to FIG. 3. FIG. 3 is a schematic block diagram illustrating the configuration of the printing management apparatus 50 according to the present invention. The printing management apparatus 50 includes a reception unit 510, a print job storage unit 520, a list generating unit 530, a list information storage unit 540, a list information transmission unit 550, and a print job transmission unit 560.

In FIG. 3, the reception unit 510 receives a print job sent by a printing control apparatus 20. The print job storage unit 520 stores the print job received by the reception unit 510. The list generating unit 530 generates list information of print jobs stored in the print job storage unit 520. In one embodiment, the list generating unit 530 may generates list information that lists print jobs classified according to users, as shown in FIG. 4. The list information storage unit 540 stores the list information of print jobs generated by the list generating unit 530. The list information transmission unit 550 identifies a user in the list information send request send by a printing control apparatus 20 based on information for identifying the user included in the list information send request, reads list information corresponding to the user from the list information storage unit 540, and sends it to the printing control apparatus.

The print job transmission unit 560 reads the print job that has been requested in the send request of the print job sent by the printing control apparatus 20 from the print job storage unit 520, and sends it to the printing control apparatus 20. In this embodiment, the printing management apparatus 50 can execute printing according to a print job using a printer apparatus 10 that has a part of the functions of the printing control apparatus 20 (slave), i.e., the functions of the reception unit 210, the print job storage unit 215, the input unit 225, the list requesting unit 230, the authenticating unit 245, the list information output unit 250, and the output unit 270 shown in FIG. 2, and is connected to the printer apparatus 10.

Figure 5:
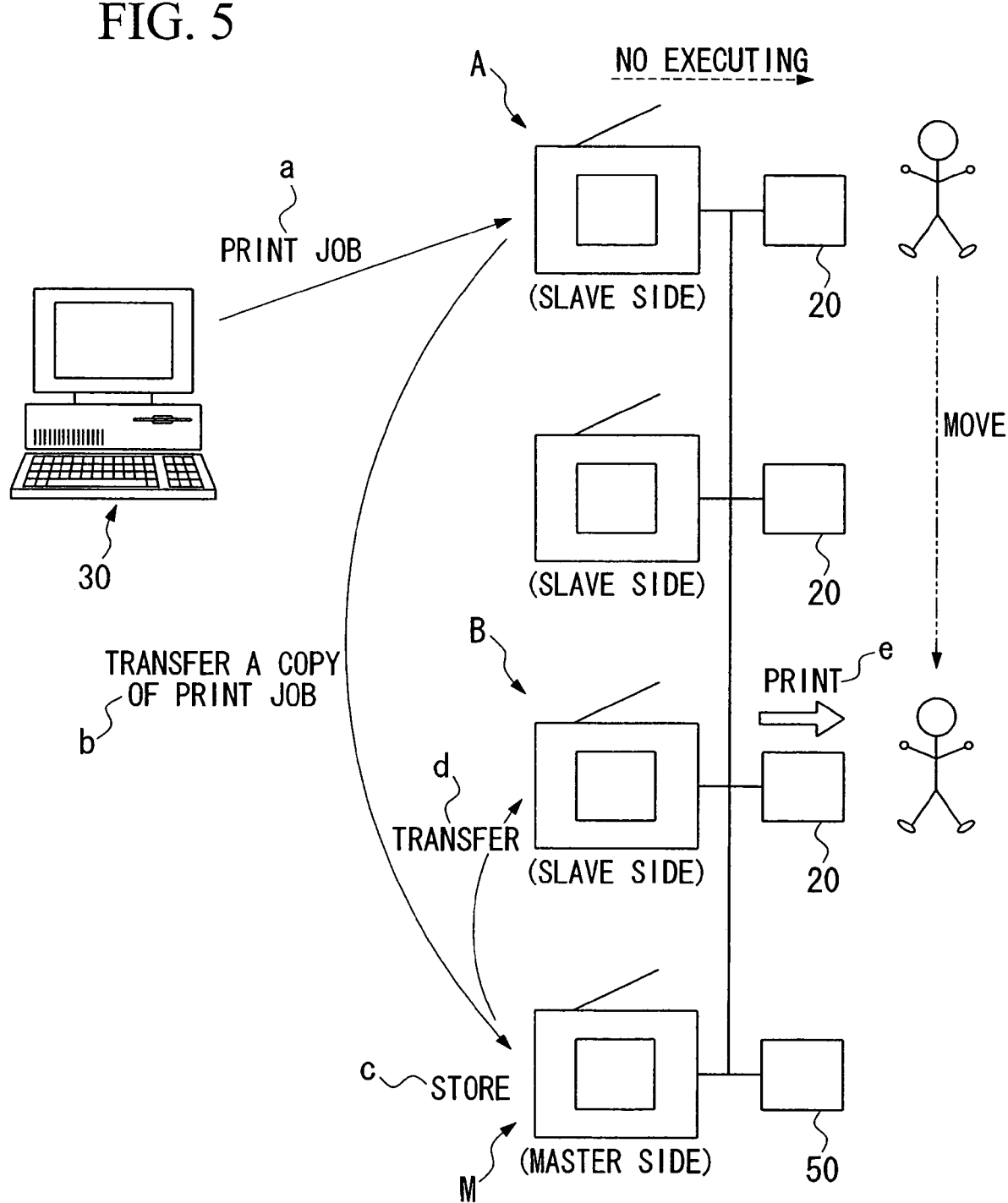
FIG. 5 is a schematic diagram illustrating the operation of the printing system according to the present invention.

Next, the operation of the printing system of the present invention will be described briefly with reference to FIG. 5. In this example, two combinations of a printing control apparatus 20 and a printer apparatus 10 are referred to as slaves A and B, and a combination of the printing management apparatus 50 and the printer apparatus 10 are referred to a master M.

The terminal apparatus 30 sends a print job that is made by the user in a print command to the slave A that has the printer apparatus 10A as a designated printer (reference symbol "a"). The slave A stores the print job received from the terminal apparatus 30, and sends a copy of the print job to the master M (reference symbol "b"). The master M receives the print job that is sent by the slave A, and stores it (reference symbol "c").

Then, instead of making the slave A execute the print job, the user walks to the place where the slave B is located, and instructs the slave B to execute the print job. The slave B requests the print job instructed by the user to the master M, receives the requested job from the master M (reference symbol "d"), and executes the print job (reference symbol "e").

In this manner, the print job can be executed by the slave B, instead of the slave A that has been originally designated for the print job. Next, the operation of the printing system of the present invention will be described with reference to FIG. 6. FIG. 6 is a flowchart showing the operation of the printing system shown in FIG. 1.

When print data is generated in the terminal apparatus 30 by an operation of the user, a user ID of the user who has created the print data is added to the data, which is sent to a first printing control apparatus 20 as a print job. The printing control apparatus 20 receives the print job sent from the terminal apparatus 30 by way of the reception unit 210 (step S1). The received print job is stored in the print job storage unit 215 of the first printing control apparatus 20 (step S11), and then is sent to the printing management apparatus 50, which is the master, by the transmission unit 220 (step S12). The printing management apparatus 50 receives the print job from the printing control apparatus 20 that is the slave (step S30) by way of the reception unit 510, and stores the received print job in the print job storage unit 520 in the printing management apparatus 50. Once the print job is stored in the print job storage unit 520, a print job list is generated using the user ID added to the print job (step S31) and is stored in the list information storage unit 540.

Once the printing control apparatus 20 transfers the print job, it authenticates the user based on information entered by the user (step S13). When the authentication is successful, the list information output unit 250 identifies the user according to the result of the authentication (step S14). The list information output unit 250 then generates a list by classifying the print jobs that have been stored in the print job storage unit 215 according to the user (step S15), and displays the list on the screen.

The user looks up the information output to the list information output unit 250, and selects a print job that the user would like to execute. In this case, it is assumed that the user moves to a place where a second printer apparatus 10 different from a first printer apparatus 10 that the user has designated for the print job via the terminal apparatus 30 is located. In this case, the print job is not stored in a second printing control apparatus 20 related to the second printer apparatus 10. When a "Master List Request" button or the like is depressed by the user, the second printing control apparatus 20 requests a list of print jobs that have not been received by this second printing control apparatus 20. When a "Master List Request" button on the input unit 225 is depressed, a list requesting unit 230 of the second printing control apparatus 20 determines that this list requesting unit 230 does not have the print job to be executed (step S16), and sends a list information send request to the printing management apparatus 50 as well as the authenticated user ID (step S17).

Once the list information transmission unit 550 in the printing management apparatus 50 receives the list information send request, the list corresponding to the user ID is read from the list information storage unit 540 (step S32) and the list is sent to the second printing control apparatus 20 (step S33). A list information reception unit 240 in the second printing control apparatus 20 receives the list sent by the printing management apparatus 50 and displays it on a list information output unit 250 (step S18). When the user selects a print job in the list received from the printing management apparatus 50 and enters a print command via the input unit 225 (step S19), a print job requesting unit 260 in the second printing control apparatus 20 sends a send request for the selected print job to the printing management apparatus 50 (step S20).

The print job transmission unit 560 in the printing management apparatus 50 reads from the print job storage unit 520 the print job that has been requested (step S34), and sends it to the second printing control apparatus 20 (step S35). An output unit 270 in the second printing control apparatus 20 receives the print job sent from the printing management apparatus 50 (step S21), and output the received print job together with the print command on a printer apparatus 10. In this manner, the print job is executed on the second printer apparatus 10 that is located where the user moves to, and that is different from the first printer that was initially selected for the print job (step S24).

In step S16, when one of the print jobs that have been stored in the print job storage unit 215 is selected and a print command is entered, the output unit 270 reads the instructed print job from the print job storage unit 215 (step S23) and sends it together with the print command to the printer apparatus 10. In this manner, the print job is executed on the printer apparatus 10 that has been designated for the print job (step S22).

In the embodiments described above, when a print job is sent from the printing management apparatus 50 that is the master or a printing control apparatus 20 that is a slave, the sent print job may be deleted from the memory of the print job storage unit 520 in the printing management apparatus 50. In addition, print jobs may be deleted from the memory of the print job storage unit 520 after a certain time period, for example, one day, has passed.

The above example has been given assuming that print jobs are received by the printing control apparatuses 20. However, print jobs may be received by the printer apparatuses 10, and the printing control apparatus 20 may obtain the received print jobs from the printer apparatus 10.

In addition, while print jobs are displayed in a list on which the user can make a selection in the embodiment described above, job ID for identifying respective print jobs are designated to each of the print jobs and the use may enter a job ID to select a certain print job. Furthermore, the printing control apparatus 20 may be provided the printer apparatus 10, as the printer apparatus 10a shown in FIG. 1.

Programs for implementing the functions of the slave, i.e., functions of the reception unit 210, the transmission unit 220, the authenticating unit 245, the list information output unit 250, the list information reception unit 240, the input unit 225, the list requesting unit 230, the print job requesting unit 260, and the output unit 270 shown in FIG. 2; and functions of the master, i.e., functions of the reception unit 510, the list generating unit 530, the list information transmission unit 550, the print job transmission unit 560 shown in FIG. 3 may be stored in a computer readable recording medium. The print management may be realized by making a computer system read the programs stored on this recording medium and execute the programs. For providing the functions of the master, programs for implementing the functions of the server may be installed on a server, and the server may be employed as the printing management apparatus 50. In such a case, a printer apparatus 10 is not necessarily connected to the printing management apparatus 50. As used herein, the term "computer system" is not limited to a computer, but includes an operating system and hardware, such as a peripheral device.

Furthermore, if the "computer system" utilizes the world wide web (WWW), the computer system may include a web providing environment (or web browsing environment).

In addition, the term "the computer-readable storage medium" refers to storage, such as a removable medium (e.g., a flexible disk, a magneto-optical disk, ROM, a CD-ROM), or a storage device, such as a hard disk, which is installed into a computer system. Furthermore, the term "computer-readable storage medium" includes a medium which can dynamically retain a program for a short term, for example, a communication line over which the program is sent via a communication network (e.g., a network or a telephone line). Alternatively, it may be a medium which can store a program for a certain period of time, such as a volatile memory in a computer system which is capable of being a server or a client when the program is transmitted via a network. In addition, the above-described program may execute only part of the functionalities mentioned above, and the functionalities may be implemented in conjunction with a program which has already been stored in a computer system in advance.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A printing control apparatus in a printing system, the printing system comprising a terminal apparatus; a plurality of printer apparatuses connected to the terminal apparatus; and a printing management apparatus connected to the printing system, the printing control apparatus comprising:

a reception unit that receives a print job sent by the terminal apparatus;

a transmission unit that sends the print job received by the reception unit to the printing management apparatus;

a print job requesting unit that sends the printing management apparatus a print job send request requesting at least one print job that has been sent by another printing control apparatus that is different from the printing control apparatus;

an output unit that receives a print job sent by the printing management apparatus in response to the print job send request from the print job requesting unit, and sends the received print job to the printer apparatus;

a list requesting unit that sends to the printing management apparatus a print job list information send request requesting a list of at least one print job stored in the printing management apparatus; and a list information reception unit that receives print job list information sent from the printing management apparatus in response to the list information send request from the list requesting unit.

2. A printing management apparatus in a printing system, the printing system comprising a terminal apparatus; a plurality of printer apparatuses connected to the terminal apparatus; and a printing control apparatus provided for one of the printer apparatuses; the printing management apparatus connected to the printing system, the printing management apparatus comprising:

a reception unit that receives a print job sent by the printing control apparatus;

a print job storage unit that stores the print job received by the reception unit;

a print job transmission unit that reads the print job from the print job storage unit in response to a print job send request from the printing control apparatus, and sends the print job to the printing control apparatus;

a list information storage unit that stores a list of the at least one print job that is stored in the print job storage unit; and a list information transmission unit that reads from the list information storage unit the list in response to a list information send request sent from the printing control apparatus, and sends the read list to the printing control apparatus.

3. A printing system, comprising:
a terminal apparatus;
a plurality of printer apparatuses connected to the terminal apparatus;
a printing control apparatus provided for one of the printer apparatuses;
and a printing management apparatus connected the printing system,
wherein the printing control apparatus comprises:
a reception unit that receives a print job sent by the terminal apparatus;
a transmission unit that sends the print job received by the reception unit to the printing management apparatus;
a print job requesting unit that sends the printing management apparatus a print job send request requesting at least one print job that has been sent by another printing control apparatus that is different from the printing control apparatus;
an output unit that receives a print job sent by the printing management apparatus in response to the print job send request from the print job requesting unit, and sends the received print job to the printer apparatus;
a list requesting unit that sends to the printing management apparatus a print job list information send request requesting a list of at least one print job stored in the printing management apparatus; and
a list information reception unit that receives print job list information sent from the printing management apparatus in response to the list information send request from the list requesting unit,
wherein the printing management apparatus comprises:
a reception unit that receives a print job sent by the printing control apparatus;
a print job storage unit that stores the print job received by the reception unit; and
a print job transmission unit that reads the print job from the print job storage unit in response to a print job send request from the printing control apparatus, and sends the print job to the printing control apparatus.

4. A print control method used in a printing control apparatus in a printing system, the printing system comprising a terminal apparatus; a plurality of printer apparatuses connected to the terminal apparatus; and a printing management apparatus connected to the printing system, the print control method comprising:
receiving a print job sent by the terminal apparatus;
sending the received print job to the printing management apparatus;
sending to the printing management apparatus a print job send request requesting at least one print job that has been sent by another printing control apparatus that is different from the printing control apparatus;
receiving a print job sent by the printing management apparatus, and sending the received print job to the printer apparatus;
sending to the printing management apparatus a print job list information send request requesting a list of at least one print job stored in the printing management apparatus; and
receiving print job list information sent from the printing management apparatus in response to the list information send request from the list requesting unit.

5. A print management method used in a printing management apparatus in a printing system, the printing system comprising a terminal apparatus; a plurality of printer apparatuses connected to the terminal apparatus; a printing control apparatus provided for one of the printer apparatuses; and the printing management apparatus connected to the printing system, the printing management method comprising:
receiving and storing a print job sent by the printing management apparatus; reading from a print job storage unit the print job in response to a send request from the printing control apparatus, and sending the print job to the printing control apparatus;
storing a list of the at least one print job that is stored in the print job storage unit;
reading from a list information storage unit the list in response to a list information send request sent from the printing control apparatus; and
sending the read list to the printing control apparatus.

6. A printing control program used in a printing control apparatus in a printing system, the printing system comprising a terminal apparatus; a plurality of printer apparatuses connected to the terminal apparatus; and a printing management apparatus connected to the printing system, the printing control program comprising the steps of:
receiving a print job sent by the terminal apparatus;
sending the received print job to the printing management apparatus;
sending to the printing management apparatus a print job send request requesting at least one print job that has been sent by another printing control apparatus that is different from the printing control apparatus;
receiving a print job sent by the printing management apparatus, and sending the received print job to the printer apparatus;
sending to the printing management apparatus a print job list information send request requesting a list of at least one print job stored in the printing management apparatus; and
receiving print job list information sent from the printing management apparatus in response to the list information send request from the list requesting unit.

7. A printing management program used in a printing management apparatus in a printing system, the printing system comprising a terminal apparatus; a plurality of printer apparatuses connected to the terminal apparatus; a printing control apparatus provided for one of the printer apparatuses; and the printing management apparatus connected to the printing system, the printing management program comprising:
receiving and storing a print job sent by the printing management apparatus;
reading from a print job storage unit the print job in response to a send request from the printing control apparatus, and sending the print job to the printing control apparatus;
storing a list of the at least one print job that is stored in the print job storage unit;
reading from a list information storage unit the list in response to a list information send request sent from the printing control apparatus; and
sending the read list to the printing control apparatus.

* * * * *